UNITED STATES PATENT OFFICE.

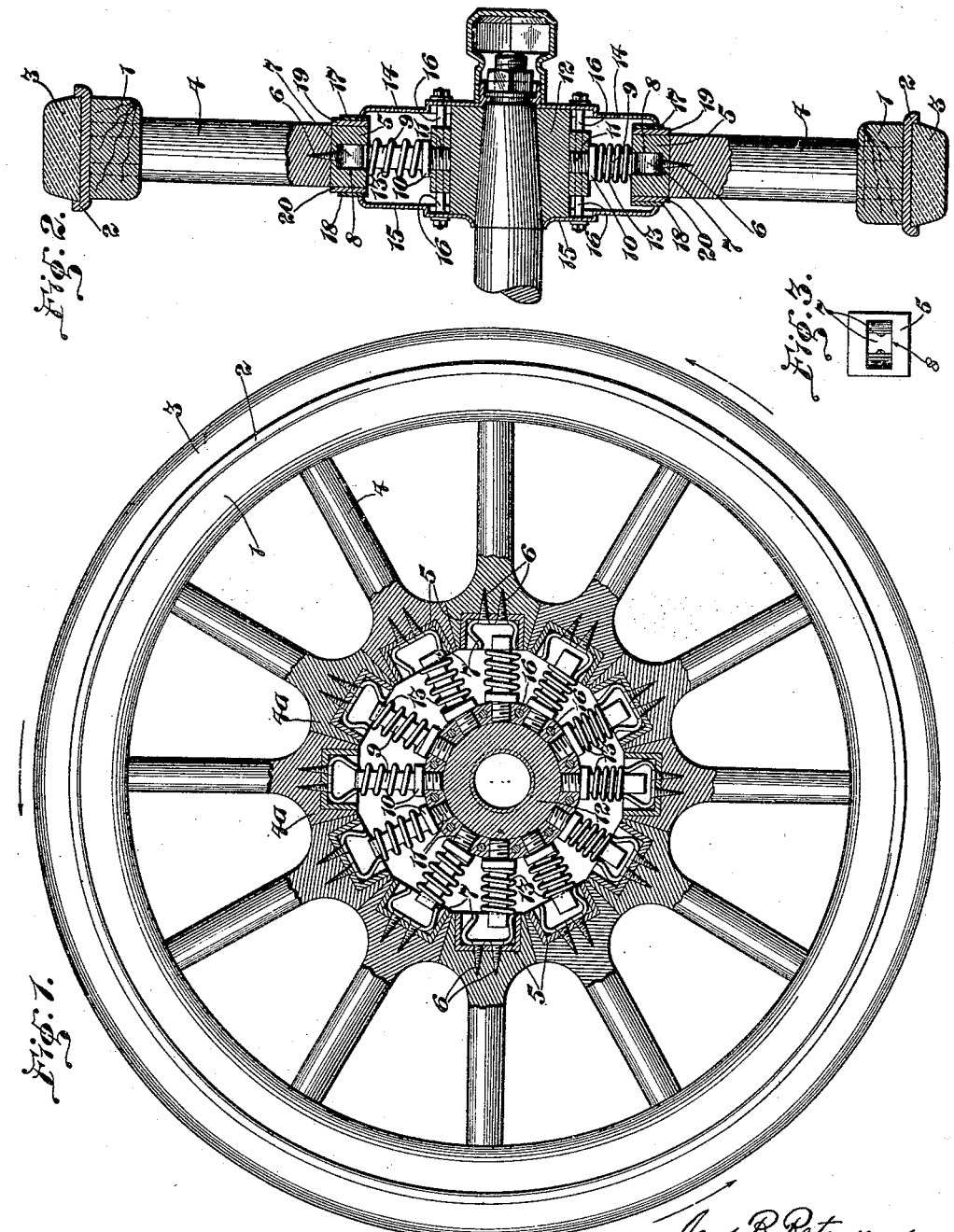

JENS P. PETERSEN, OF CARUTHERSVILLE, MISSOURI.

RESILIENT WHEEL.

1,410,593.  Specification of Letters Patent.  Patented Mar. 28, 1922.

Application filed October 13, 1919. Serial No. 330,391.

*To all whom it may concern:*

Be it known that I, JENS P. PETERSEN, a subject of the King of Denmark, residing at Caruthersville, in the county of Pemiscot, State of Missouri, have invented certain new and useful Improvements in Resilient Wheels, of which the following is a full and exact description.

This invention relates to resilient wheels primarily intended for, but not restricted to, use upon motor-driven vehicles, and has for its principal object the provision of a wheel having resilient members disposed between the felly and hub adapted to absorb the jars resulting from travel over rough roads and to reduce the strain upon the engine and drive shaft when starting the vehicle.

Referring to the annexed drawing, wherein like numerals of reference denote corresponding parts throughout, Figure 1 is a side elevation, partly in section, of the complete wheel; Figure 2 a vertical section taken substantially through the center of Figure 1 and showing the manner of enclosing the resilient members disposed the hub and felly; and Figure 3 a detail view of the bottom of one of the metal boxes containing certain of said members.

The felly 1 is provided with a flanged or other suitable rim 2 for the retention of a solid rubber tire 3, said felly being supported by a plurality of spokes 4 which are retained in proper spaced relation by the wedge-shaped formation of their inner extremities 4ª. Each of said extremities is provided with a recess for the reception of a metal box 5 secured by screws 6 which project through the base of spring 7, the latter consisting of a strip of resilient steel the ends of which are bent upward and inward, substantially as illustrated, so as to clear the sides of said box.

The bottom of box 5 is provided with an oblong slot 8 (Figure 3) in register with spring 7 through which projects a metal post 9 having a collar 10 and a threaded lower extremity 11 which is screwed into the hub 12, said post serving as a support for helical spring 13 which is compressed between said collar and the bottom of said box.

As shown in Figure 2, posts 9 and springs 13 are concealed from view by annular plates 14—15 secured to the hub by bolts 16, the periphery of said plates bearing against rubber or leather rings 17—18 which are cemented or otherwise affixed to the outer surface of flat metal hoops 19—20 bolted to spokes 4 and serving to retain the latter in alignment.

From the foregoing it will be appreciated that the strain imposed upon the engine, drive shaft and rear axle when starting an automobile is considerably reduced by the yielding resistance offered by the terminals of springs 7 to the limited independent rotation of hub 12 and that said springs also assist in absorbing the shocks resulting from travel over rough roads or from backing the wheels against a curb or abrupt application of the brakes which are mainly imposed upon helical springs 13 as will be understood by reference to the drawing.

Having thus fully described the invention, what I claim as new and desire to secure by Letters-Patent is:—

1. A wheel of the character described comprising a hub, posts projecting radially therefrom, spokes arranged in alignment with said posts, a felly engaging the outer extremity of said spokes, resilient members secured to the inner extremity of said spokes opposite said posts adapted to cushion the latter during rotation of the wheel, and springs confined between said hub and spokes to maintain said hub substantially concentric with said felly.

2. A wheel of the character described comprising a hub, posts projecting radially therefrom, spokes arranged in alignment with said posts, a felly engaging the outer extremity of said spokes, resilient members secured to the inner extremity of said spokes opposite said posts adapted to cushion the latter during rotation of the wheel, and helical springs encircling said posts to maintain said hub substantially concentric with said felly.

3. A wheel of the character described comprising a hub, posts projecting radially therefrom, spokes arranged in alignment with said posts, a felly engaging the outer extremity of said spokes, resilient members secured to the inner extremity of said spokes opposite said posts adapted to cushion the latter during rotation of the wheel, springs confined between said hub and spokes to maintain said hub substantially concentric with said felly, and hoops detachably secured to said spokes opposite the location of said members.

4. A wheel of the character described comprising a hub, posts projecting radially therefrom, spokes arranged in alignment with said posts, a felly engaging the outer extremity of said spokes, resilient members secured to the inner extremity of said spokes opposite said posts adapted to cushion the latter during rotation of the wheel, springs confined between said hub and spokes to maintain said hub substantially concentric with said felly, and annular plates, detachably secured to said hub, enclosing said posts and springs.

5. A wheel of the character described comprising a hub, posts projecting radially therefrom, spokes arranged in alignment with said posts, a felly engaging the outer extremity of said spokes, resilient members secured to the inner extremity of said spokes opposite said posts adapted to cushion the latter during rotation of the wheel, springs confined between said hub and spokes to maintain said hub substantially concentric with said felly, hoops detachably secured to said spokes opposite the location of said members, and annular plates, detachably secured to said hub, enclosing said posts and springs, the periphery of said plates overlapping said hoops.

JENS P. PETERSEN.

Witnesses:
 ROBERT VOGELSANG,
 A. G. KEMPE.